United States Patent [19]

Epple

[11] 4,136,100
[45] Jan. 23, 1979

[54] ANTHRAQUINOID DYES

[75] Inventor: Gerhard Epple, Weisenheim, Fed. Rep. of Germany

[73] Assignee: BASF Aktiengesellschaft, Ludwigshafen, Fed. Rep. of Germany

[21] Appl. No.: 834,411

[22] Filed: Sep. 19, 1977

[30] Foreign Application Priority Data

Oct. 4, 1976 [DE] Fed. Rep. of Germany ....... 2644731

[51] Int. Cl.² .................. C07C 49/68; C09B 1/02; C09B 1/42
[52] U.S. Cl. .................... 260/377; 260/376; 260/380
[58] Field of Search .......... 260/380, 376, 377

[56] References Cited

FOREIGN PATENT DOCUMENTS 704830  3/1965  Canada ............................ 260/380
965006  7/1964  United Kingdom ............. 260/380

Primary Examiner—Allen B. Curtis
Assistant Examiner—Raymond Covington
Attorney, Agent, or Firm—Keil, Thompson & Shurtleff

[57] ABSTRACT

Dyes of the formula

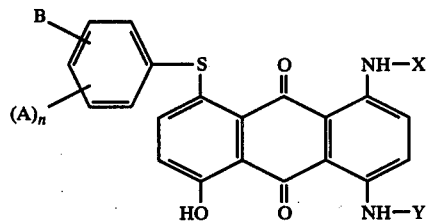

where Y is alkyl of 3 to 18 carbon atoms or phenyl which is unsubstituted or substituted by chlorine, bromine, alkoxy of 1 to 4 carbon atoms, alkoxycarbonyl (where alkoxy is of 1 to 4 carbon atoms), phenoxy, benzoylamino, trifluoromethyl or alkylcarbonyl (where alkyl is of 1 to 6 carbon atoms), X is hydrogen or

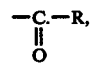

where R is alkyl of 1 to 17 carbon atoms, phenylamino, phenyl, alkoxycarbonyl-alkyl (where alkoxy is of 1 to 8 carbon atoms and alkyl of 2 to 4 carbon atoms), alkoxy of 1 to 10 carbon atoms or alkoxyalkyl of a total of 3 to 12 carbon atoms, A is chlorine, bromine, alkyl of 1 to 4 carbon atoms or alkoxy of 1 to 4 carbon atoms, B is hydrogen or nitro and n is 0, 1, 2 or 3. On cellulose and cellulose-containing textiles, the dyes, used in the presence of swelling agents, give bluish violet to greenish blue dyeings having very good fastness properties.

10 Claims, No Drawings

ANTHRAQUINOID DYES

The present invention relates to new anthraquinoid dyes based on α-tetrasubstituted anthraquinone, to a process for their manufacture and to the use of these dyes.

The new dyes have the formula

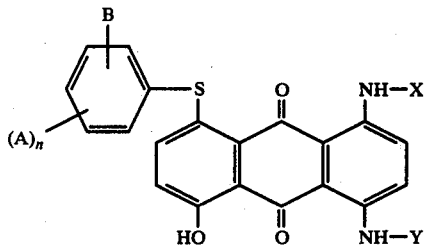

(I)

where Y is saturated, unsubstituted or substituted, alkyl of 3 to 18 carbon atoms, or is unsubstituted or substituted phenyl, X is hydrogen or

where R is saturated, linear or branched, unsubstituted or substituted alkyl of 1 to 17 carbon atoms, alkoxycarbonyl-alkyl (where alkoxy is of 1 to 8 carbon atoms and alkyl is of 2 to 4 carbon atoms), unsubstituted or substituted phenylamino, unsubstituted or substituted phenyl, alkoxy of 1 to 10 carbon atoms or alkoxyalkoxy of a total of 3 to 12 carbon atoms, A is chlorine, bromine, alkyl of 1 to 4 carbon atoms or alkoxy of 1 to 4 carbon atoms, B is hydrogen or nitro and n is 0, 1, 2 or 3, and if n > 1 the radicals A may be identical or different.

The new dyes may be used, in the presence of carriers, for printing cellulose and cellulose-containing textile material, eg. cellulose-polyester union. The prints obtained possess bluish violet to greenish blue hues and exhibit very good fastness properties. Above all, fastness to wet treatments, crocking, drycleaning and light should be mentioned. The dyes exhibit no sublimation during fixing. On washing the prints, no staining of any white ground occurs.

Examples of substituents of Y (when the latter is alkyl of 3 to 18 carbon atoms) are cycloalkyl of 5 to 8 carbon atoms, preferably cyclohexyl, alkoxy of 1 to 4 carbon atoms, phenyl and phenoxy. 1 or 2 of the substituents may be present on the alkyl. In addition, phenyl and phenoxy may be substituted by from 1 to 3, preferably by 1 or 2, alkyl of 1 to 4 carbon atoms, methoxy, ethoxy, chlorine or bromine, and the substituents may be identical or different. Alkyl Y is preferably alkyl of 3 to 5 carbon atoms, especially sec. butyl.

Y may also be phenyl or substituted phenyl, the latter being a radical of the formula

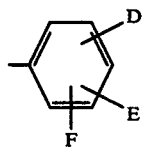

where D, E and F are hydrogen, alkyl of 1 to 4 carbon atoms, alkoxy of 1 to 4 carbon atoms, chlorine or bromine and may be identical or different, or D and E are hydrogen and F is alkoxycarbonyl (where alkoxy is of 1 to 4 carbon atoms), phenoxy, benzoylamino, trifluoromethyl or alkylcarbonyl of 1 to 6 carbon atoms.

Preferred compounds of the formula I are those where Y is phenyl which may be unsubstituted or substituted by from 1 to 3 methyl, chlorine, methoxy or phenoxy.

Specific examples of alkyl Y are propyl, isopropyl, 2-butyl, isobutyl, 1-butyl, 1-pentyl, 2-pentyl, 2-methyl-3-butyl, 1-hexyl, 3-hexyl, 1-octyl, 2-octyl, 2,4-dimethyl-3-phenyl and 2-isopropyl-5-methyl-1-hexyl; 2-methoxyethyl, 3-propoxypropyl, 2-ethoxyethyl, 2-butoxyethyl, 2-isobutoxyethyl, 3-methoxypropyl, 3-ethoxypropyl, 3-isopropoxypropyl, 3-butoxypropyl and 3-isobutoxypropyl; 1-phenyl-1-propyl, 1-phenyl-2-propyl, 1-phenyl-1-butyl, 1-phenyl-2-butyl, 3-phenyl-2-butyl, 2-phenyl-4-heptyl, 1-phenyl-3-methyl-2-butyl, 1-phenyl-2-methyl-4-butyl, 2-phenyl-4-pentyl, 3-(4'-isopropylphenyl)-1-butyl, 3-(4'-methylphenyl)-1-butyl, 3-(4'-methoxyphenyl)-1-butyl, 3-(3',4'-methylenedioxyphenyl)-2-methyl-1-propyl and 1,3-diphenyl-2-propyl; and 3-cyclohexyl-1-butyl.

Specific examples of phenyl Y of the formula II are phenyl, o-, m- and p-methylphenyl, o-, m- and p-ethylphenyl, p-n-butyl-phenyl, p-tert.-butylphenyl, p-n-octylphenyl, o-, m- and p-methoxy-phenyl, o-, m- and p-ethoxyphenyl, 2,3-, 2,4-, 2,5-, 3,4- and 3,5-dimethylphenyl, 2,4,6-trimethylphenyl, 2,4-,2,5- and 3,5-dimethoxy-phenyl, 3-isopropyl-4-methoxy-phenyl, o-, m- and p-chlorophenyl, o-, m- and p-bromophenyl, 3-trifluoromethylphenyl, 2,3-, 2,4-, 2,5- and 3,5-dichlorophenyl, 2-chloro-4-methylphenyl, 2-chloro-5-methyl-phenyl, 3-chloro-2-methylphenyl, 4-chloro-2-methylphenyl, 5-chloro-2-methylphenyl, 2-bromo-4-methylphenyl, 2-chloro-5-methoxyphenyl, 5-chloro-2-methoxyphenyl, 2,4-dimethyl-6-bromophenyl, 4-chloro-2,5-dimethoxyphenyl, 5-chloro-2,4-dimethoxyphenyl, 4-phenylphenyl, 4-phenyl-2-methylphenyl, 4-phenoxyphenyl, 3-cyanophenyl, 3-carbomethoxyphenyl, 4-acetylphenyl, 4-benzoylphenyl, 3-trifluoromethyl-phenyl, 3,4-methylenedioxyphenyl and 3,4-ethylenedioxyphenyl (= 1,4-dioxa-1,2,3,4-tetrahydronaphthalene).

For tinctorial reasons, dyes of the formula I where Y is phenyl, o-, m- and p-methylphenyl, m- and p-chlorophenyl, 3,5-dimethylphenyl, 2,4,6-trimethylphenyl, 4-methoxyphenyl or 4-phenoxyphenyl are preferred.

X may be hydrogen but is preferably

In the latter, R is (a) saturated, linear or branched alkyl of 1 to 17 carbon atoms which is unsubstituted or substituted by chlorine or bromine, (b) alkoxycarbonyl-alkyl (where alkoxy is of 1 to 8 carbon atoms and alkyl is of 2 to 4 carbon atoms), (c) phenylamino which is unsubstituted or substituted by chlorine, bromine, methoxy or methyl, (d) phenyl which is unsubstituted or substituted by from 1 to 3, preferably by 1, alkyl of 1 to 4 carbon atoms, alkoxy of 1 to 4 carbon atoms, chlorine or bromine, which substituents may be identical or different if more than one is present, or by nitro or trifluoromethyl, or (e) alkoxy of 1 to 10 carbon atoms or alkoxyalkoxy of a total of 3 to 12 carbon atoms.

In addition to those mentioned, further specific examples of substituents in X are:

(a) if R is unsubstituted or substituted alkyl of 1 to 17, preferably of 1 to 8, carbon atoms: methyl, ethyl, propyl, isopropyl, butyl, isobutyl, pentyl, 1-octyl, 1-heptyl, 3-heptyl, 1-pentadecyl, 1-heptadecyl, 2-chloroethyl, chloromethyl, dichloromethyl and 3-chloropropyl.

(b) If R is alkoxycarbonylalkyl: preferably alkoxycarbonylalkyl where alkoxy is of 1 to 4 carbon atoms and alkyl is of 2 to 4 carbon atoms, methoxycarbonylethyl, ethoxycarbonylethyl, butoxycarbonylethyl, methoxycarbonylpropyl, butoxycarbonylpropyl, ethoxycarbonylpropyl, propoxycarbonylpropyl, methoxycarbonylbutyl, ethoxycarbonylbutyl, propoxycarbonylbutyl and butoxycarbonylbutyl.

(c) If R is unsubstituted or substituted phenylamino: 2-, 3- and 4-methylphenylamino, 4-chlorophenylamino, 4-bromophenylamino and methoxyphenylamino.

(d) If R is unsubstituted or substituted phenyl: phenyl, 2-, 3- and 4-methylphenyl, 4-tert.-butylphenyl, 4-isopropylphenyl, 4-n-butyoxyphenyl, 4-methoxyphenyl, 4-ethoxyphenyl, 2-, 3- and 4-ethylphenyl, 2,4-dimethylphenyl, 3,5-dimethylphenyl, 2-, 3- and 4-chlorophenyl, 2-, 3- and 4-bromophenyl, 3- and 4-nitrophenyl and 3-trifluoromethylphenyl, preferably phenyl.

(e) If R is alkoxy or alkoxyalkoxy: methoxy, ethoxy, propoxy, isopropoxy, n-butoxy, n-hexoxy, pentoxy, 2-ethylhexoxy, octoxy, decyloxy, 2-methoxyethoxy, 2-ethoxyethoxy, 2-butoxyethoxy, 2-(2'-ethylhexoxy)-ethoxy, 3-methoxypropoxy, 3-ethoxypropoxy, 3-butoxypropoxy, 3-hexoxypropoxy and 3-(2'-ethylhexoxy)-propoxy, amongst which alkoxy of 1 to 4 carbon atoms is preferred.

Particularly preferred meanings of R from amongst the above are:

(a) alkyl of 1 to 8 carbon atoms, eg. methyl, ethyl, propyl, isopropyl, butyl, isobutyl, sec.-butyl, pentyl, 3-heptyl and 3-chloropropyl;

(b) methoxycarbonylalkyl (where alkyl is of 2 to 4 carbon atoms), eg. methoxycarbonylethyl, methoxycarbonylbutyl and methoxycarbonylpropyl;

(c) phenylamino;

(d) phenyl, 4-chlorophenyl, 2-, 3- and 4-methylphenyl and 3- and 4-nitrophenyl;

(e) alkoxy of 1 to 4 carbon atoms, eg. methoxy, ethoxy, propoxy and butoxy.

Examples of radicals of the formula

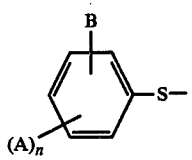
(III)

are those where n is 0, 1, 2 or 3, preferably 0, 1 or 2, A is chlorine, bromine, alkyl of 1 to 4 carbon atoms or alkoxy of 1 to 4 carbon atoms and B is hydrogen or nitro, and if n > 1 the radicals may be identical or different.

Examples of substituents A are methyl, ethyl, isopropyl, isobutyl, tert.-butyl, methoxy, ethoxy, chlorine and bromine, N = 1 or 2.

Accordingly, examples of radicals of the formula III are 2,5-dichlorothiophenyl, 2,4,5-trichlorothiophenyl, 4-bromothiophenyl, 4-tert.-butylthiophenyl and 4-nitrothiophenyl, preferably thiophenyl, 4-chlorothiophenyl, 4-methylthiophenyl and 4-methoxythiophenyl.

For economic and tinctorial reasons, unsubstituted thiophenyl is preferred amonst the above radicals of the formula III.

The new dyes may be manufactured as follows:

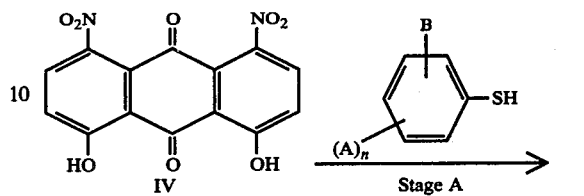

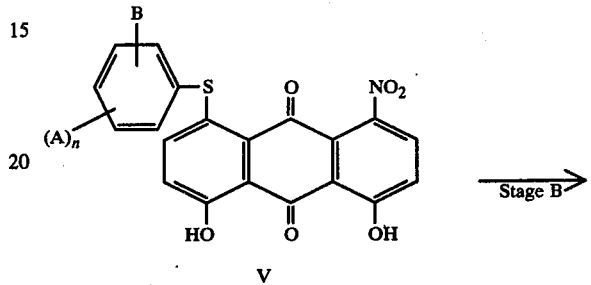
V

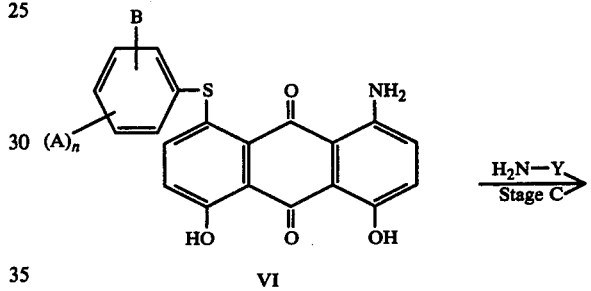
VI

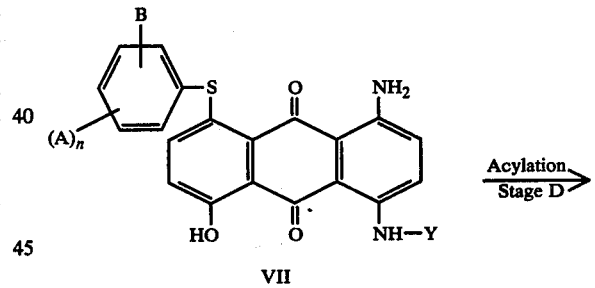
VII

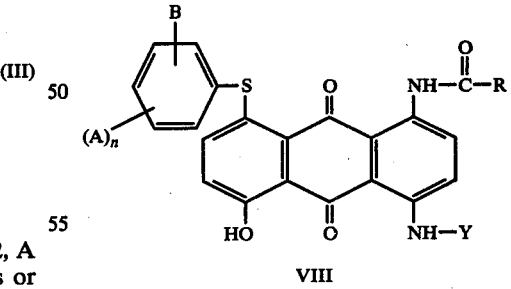
VIII 1,8-Dinitro-4,5-dihydroxyanthraquinone (IV) can be reacted with thiophenols of the formula

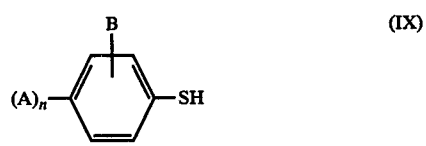
(IX)

by the process described in German Pat. No. 1,201,933 to give the corresponding 1,8-dihydroxy-4-nitro-5-thiophenylanthraquinones (V).

Examples of thiophenols of the formula IX are thiophenol, 4-methylthiophenol, 4-methoxy-thiophenol, 4-chlorothiophenol, 2,5-dichlorothiophenol, 2,4,5-trichlorothiophenol, 4-bromothiophenol, p-tert.-butylthiophenol and 4-nitrothiophenol.

The nitro-thiophenyl-anthraquinones (V) obtained can be reduced to the amino compounds (VI) by conventional methods, eg. with sodium sulfide or with hydrazine.

Condensation of the compounds (VI) with amines of the formula H₂N-Y (X) in phenol in the presence of boric acid gives 1,4-diamino-5-thiophenyl-8-hydroxy-anthraquinones (VII).

Examples of amines of the formula H₂N-Y are 2-aminopropane, 2-aminobutane, isobutylamine, 2-aminopentane, 1-aminopentane, 3-aminohexane, 2-methyl-3-aminobutane, 2,4-dimethyl-3-aminopentane, 2-aminooctane, 3-cyclohexyl-1-butylamine, 2-isopropyl-5-methyl-1-hexylamine, 2-methoxyethylamine, 3-ethoxypropylamine, 1-phenyl-2-aminopropane, 1-phenyl-1-propylamine, 1-phenyl-1-butylamine, 1-phenyl-2-butylamine, 3-phenyl-2-butylamine, 2-phenyl-4-heptylamine, 1-phenyl-3-methyl-2-butylamine, 1-phenyl-2-phenyl-4-butylamine, 2-phenyl-4-pentylamine, 3-(4'-isopropylphenyl)-1-butylamine, 2-(4'-methoxyphenyl)-1-butylamine, 3-(3',4'-methylenedioxyphenyl)-2-methyl-1-propylamine and 1,3-diphenyl-2-amino-propane; aniline, o-, m- and p-toluidine, o-, m- and p-ethylaniline, p-n-butylaniline, p-tert.-butylaniline, p-n-octylaniline, o-, m- and p-anisidine, o-, m- and p-phenetidine, 2,3-, 2,4-, 2,5-, 3,4- and 3,5-xylidine, 2,4,6-trimethylaniline, 2,4-, 2,5- and 3,5-dimethoxyaniline, 3-isopropyl-4-methoxyaniline, o-, m- and p-chloroaniline, o-, m- and p-bromoaniline, 3-trifluoromethylaniline, 2,3-, 2,4-, 2,5- and 3,5-dichloroaniline, 2-chloro-4-methylaniline, 2-chloro-5-methylaniline, 3-chloro-2-methylaniline, 4-chloro-2-methylaniline, 5-chloro-2-methylaniline, 2-bromo-4-methylaniline, 2-chloro-5-methoxy-aniline, 5-chloro-2-methoxy-aniline, 2,4-dimethyl-6-bromoaniline, 4-chloro-2,5-dimethoxyaniline, 5-chloro-2,4-dimethoxyaniline, 4-aminobiphenyl, 4-amino-2-methylbiphenyl, 4-phenoxyaniline, 3-cyanoaniline, methyl 3-aminobenzoate, 4-aminoacetophenone, 4-aminobenzophenone, 3-trifluoromethylenedioxyaniline and 3,4-ethylenedioxyaniline.

The condensation of the 1,8-dihydroxy-4-amino-5-thiophenylanthraquinones (VI) with the amines H₂N—Y is normally carried out by heating a mixture of phenol, boric acid and a solvent, eg. toluene or xylene, for from 2 to 4 hours at 150° C and distilling off the water of reaction, formed from the phenol and the boric acid, azeotropically with the solvent whilst passing nitrogen over the mixture. The amine (X) and the anthraquinone derivative (VI) are then added and the reaction mixture is heated at from 90 to 180° C, preferably from 90 to 150° C, until no further starting material is detectable. Normally, from 1.1 to 2.0 moles, preferably from 1.1 to 1.7 moles, of boric acid and from 1.0 to 6.0 moles, preferably from 1.0 to 2.5 moles, of the amine (X) are employed per mole of the anthraquinone compound (VI). After completion of the reaction, the produce (= compound of the formula VII) is precipitated by adding a diluent, eg. methanol, ethanol, isopropanol, isobutanol and water or a mixture of these materials, and is isolated in the conventional manner.

Some of the dyes of the formula VII are in themselves very suitable for printing cellulose-containing or cellulose/polyester-containing textiles. The fixing characteristics and the fastness properties, above all the lightfastness, can be improved by reacting the compounds VII with an acylating agent to give the dyes of the formula VIII.

Suitable acylating agents are those of the formula

for example acetyl chloride, propionyl chloride, butyryl chloride, isobutyryl chloride, valeryl chloride, isovaleryl chloride, hexanoyl chloride, 2-ethylhexanoyl chloride, octanoyl chloride, decanoyl chloride, stearoyl chloride, 3-chloropropionyl chloride, chloroacetyl chloride, dichloroacetyl chloride, 4-chlorobutyryl chloride, monomethylsuccinyl chloride, monoethylsuccinyl chloride, monobutylsuccinyl chloride monomethylglutaryl chloride, monobutylglutaryl chloride, monohexylglutaryl chloride, monomethyladipyl chloride, monopropyladipyl chloride, benzoyl chloride, o-, m- and p-methylbenzoyl chloride, o-, m- and p-methoxybenzoyl chloride, 4-tert.-butylbenzoyl chloride, 4-isopropylbenzoyl chloride, 4-n-butoxybenzoyl chloride, o-, m- and p-chlorobenzoyl chloride, o-, m- and p-nitrobenzoyl chloride, o-, m- and p-trifluoromethylbenzoyl chloride, o-, m- and p-bromobenzoyl chloride, methyl chloroformate, ethyl chloroformate, propyl chloroformate and butyl chloroformate. Further suitable acylating agents are phenyl isocyanate which is unsubstituted or substituted in the phenyl nucleus by methyl, chlorine, bromine or methoxy.

The acylation is normally carried out by dissolving or suspending the anthraquinone compounds in a solvent which is inert under the reaction conditions, heating the mixture to the reaction temperature and adding the acylating agent.

Examples of suitable solvents are chlorobenzene, o-dichlorobenzene, trichlorobenzene, nitrobenzene, dimethylformamide, N-methylpyrrolidone and tetrachloroethane. At least 1 mole, as a rule from 1.0 to 2 moles, preferably from 1.0 to 1.5 moles, of acylating agent are employed per mole of anthraquinone compound. After completion of the reaction, the reaction mixture is cooled and the acylation product is isolated in the conventional manner.

The Examples which follow illustrate the invention.

EXAMPLE 1

A mixture of 300 parts of phenol, 26.4 parts (0.43 mole) of boric acid and 145 parts of toluene is heated for 3 hours at 150° C whilst passing nitrogen over it; at the same time, a toluene/water mixture is distilled off. The batch is then cooled to 90° C and 85 parts (0.7 mole) of m-xylidine and 90 parts (0.25 mole) of 1,8-dihydroxy-4-amino-5-thiophenyl-anthraquinone (prepared as described in German Pat. No. 1,201,933, Example 1) are added. Thereafter the reaction mixture is heated for 14 hours at 140° C and then cooled to 80 - 90° C, 400 parts of methanol are added and the batch is allowed to cool to room temperature. The reaction product which has precipitated is filtered off, washed with methanol and water and dried. 69 parts of 1-amino-4-(3',5'-dimethylanilino)-5-hydroxy-8-thiophenylanthraquinone of melting point 222° C are obtained.

EXAMPLE 2

5 parts of the dye prepared as described in Example 1 are suspended in 30 parts of o-dichlorobenzene, 2.3 parts of benzoyl chloride are added and the mixture is heated for 2 hours at 140 – 145° C. The reaction mixture is then cooled, 80 parts of methanol are added and the acylation product which has precipitated is filtered off. After washing with methanol and drying, 5.2 parts of 1-benzoyl-amino-4-(3',5'-dimethylanilino)-5-hydroxy-8-thiophenylanthraquinone are obtained.

EXAMPLES 2 TO 63

The compounds shown in the Table which follows were prepared by the methods described in Examples 1 and 2.

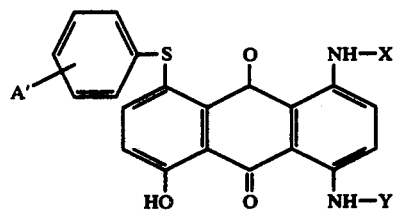

| Example No. | A' | Y | X | Hue on cotton and cotton-polyester |
|---|---|---|---|---|
| 3 | H | —CH(CH$_3$)—CH$_2$—CH$_3$ | H | clear greenish blue |
| 4 | 4-CH$_3$O | —CH(CH$_3$)—CH$_2$—CH$_3$ | H | blue |
| 5 | H | —CH(CH$_3$)—CH$_2$—CH$_3$ | —CO—CH(CH$_3$)—CH$_3$ | reddish blue |
| 6 | H | —CH(CH$_3$)—CH$_2$—CH$_3$ | —CO—OCH$_3$ | reddish blue |
| 7 | 4-Cl | —C$_6$H$_4$—CH$_3$ | H | blue |
| 8 | H | —C$_6$H$_4$—CH$_3$ | H | greenish blue |
| 9 | 4-CH$_3$O— | —C$_6$H$_4$—CH$_3$ | —CO—CH$_3$ | blue |
| 10 | 4-Cl | —C$_6$H$_4$—CH$_3$ | —CO—CH(CH$_3$)—CH$_3$ | blue |
| 11 | 4-Cl | —C$_6$H$_4$—CH$_3$ | —CO—CH$_3$ | blue |
| 12 | 4-CH$_3$O | —C$_6$H$_4$—CH$_3$ | —CO—OCH$_3$ | blue |
| 13 | H | —C$_6$H$_4$—CH$_3$ | —CO—CH$_3$ | blue |
| 14 | 4-CH$_3$O— | —C$_6$H$_4$—CH$_3$ | —CO—NH—C$_6$H$_5$ | greenish blue |
| 15 | H | —C$_6$H$_4$—CH$_3$ | —CO—NH—C$_6$H$_5$ | greenish blue |
| 16 | H | 2-CH$_3$—C$_6$H$_4$— | H | blue |
| 17 | H | " | —CO—CH$_3$ | blue |
| 18 | H | " | —CO—CH(CH$_3$)—CH$_3$ | blue |

-continued

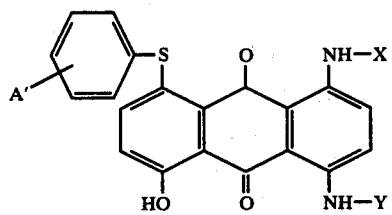

| Example No. | A' | Y | X | Hue on cotton and cotton-polyester |
|---|---|---|---|---|
| 19 | H | " | $-\overset{O}{\underset{\|}{C}}-CH-(CH_2)_3CH_3$ <br> $\quad\quad\;\;\; \|$ <br> $\quad\quad\;\; C_2H_5$ | blue |
| 20 | H | " | $-\overset{O}{\underset{\|}{C}}-CH_2-CH_3$ | blue |
| 21 | H | " | $-\overset{O}{\underset{\|}{C}}-NH-\phi$ | greenish blue |
| 22 | H | " | $-\overset{O}{\underset{\|}{C}}CH_2CH_2\overset{O}{\underset{\|}{C}}-OCH_3$ | blue |
| 23 | H | " | $-\overset{O}{\underset{\|}{C}}-O-CH_3$ | blue |
| 24 | H | " | $-\overset{O}{\underset{\|}{C}}-OC_4H_9$ | blue |
| 25 | H | " | $-\overset{O}{\underset{\|}{C}}-\phi$ | blue |
| 26 | H | $-\phi-CH_3$ (m) | H | blue |
| 27 | H | " | $-\overset{O}{\underset{\|}{C}}-CH-CH_3$ <br> $\quad\quad\;\; \|$ <br> $\quad\quad\; CH_3$ | blue |
| 28 | H | $-\phi-Cl$ (m) | $-\overset{O}{\underset{\|}{C}}-OC_4H_5$ | bluish violet |
| 29 | H | " | $-\overset{O}{\underset{\|}{C}}-\phi$ | bluish violet |
| 30 | H | $-\phi-Cl$ (p) | $-\overset{O}{\underset{\|}{C}}-CH_3$ | bluish violet |
| 31 | H | " | H | blue |
| 32 | H | $-\phi-OCH_3$ (p) | $-\overset{O}{\underset{\|}{C}}-CH_3$ | reddish blue |
| 33 | H | " | $-\overset{O}{\underset{\|}{C}}-CH-CH_3$ <br> $\quad\quad\;\; \|$ <br> $\quad\quad\; CH_3$ | bluish violet |
| 34 | H | $-\phi-Cl$ (p) | $-\overset{O}{\underset{\|}{C}}-NH-\phi$ | greenish blue |
| 35 | H | " | $-\overset{O}{\underset{\|}{C}}-\phi$ | blue |
| 36 | H | " | $-\overset{O}{\underset{\|}{C}}-CH_2CH_2\overset{O}{\underset{\|}{C}}-OCH_3$ | blue |
| 37 | H | " | $-\overset{O}{\underset{\|}{C}}-OCH_3$ | blue |
| 38 | H | $-\phi-OCH_3$ (p) | $-\overset{O}{\underset{\|}{C}}-NH-\phi$ | greenish blue |

-continued

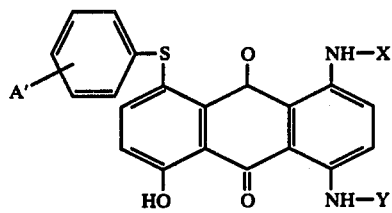

| Example No. | A' | Y | X | Hue on cotton and cotton-polyester |
|---|---|---|---|---|
| 39 | H | " | —C(O)—CH(CH₂)₃CH₃ with C₂H₅ | sky blue |
| 40 | H | " | —C(O)—OCH₃ | reddish blue |
| 41 | H | " | —C(O)—OC₂H₅ | blue |
| 42 | H | " | —C(O)—CH₂CH₂C(O)—OCH₃ | blue |
| 43 | H | " | —C(O)—C₆H₄—NO₂ | reddish blue |
| 44 | H | 2,5-dimethylphenyl | —C(O)—CH₃ | blue |
| 45 | H | " | —C(O)—CH(CH₃)CH₃ | sky blue |
| 46 | H | " | —C(O)—CH(CH₂)₃CH₃ with C₂H₅ | sky blue |
| 47 | H | " | —C(O)—CH₂—CH₃ | blue |
| 48 | H | " | —C(O)—NH—C₆H₅ | greenish blue |
| 49 | H | " | —C(O)—CH₂CH₂C(O)—OCH₃ | blue |
| 50 | H | " | —C(O)—CH₂—CH₃ | blue |
| 51 | H | " | —C(O)—OC₄H₉ | blue |
| 52 | H | 2,4,6-trimethylphenyl | —C(O)—OCH₃ | blue |
| 53 | H | 3-chlorophenyl | —C(O)—NH—C₆H₅ | blue |
| 54 | H | 3-methylphenyl | —C(O)—CH(CH₂)₃CH₃ with C₂H₅ | blue |
| 55 | H | " | —C(O)—CH₂—CH₃ | blue |

-continued

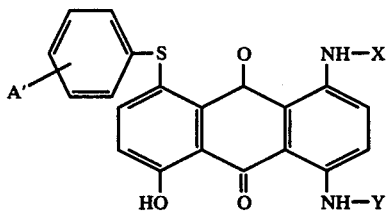

| Example No. | A' | Y | X | Hue on cotton and cotton-polyester |
|---|---|---|---|---|
| 56 | H | " | —C(=O)—NH—C₆H₅ | greenish blue |
| 57 | H | " | —C(=O)—CH₂CH₂C(=O)—OCH₃ | blue |
| 58 | H | " | —C(=O)—OCH₃ | blue |
| 59 | H | " | —C(=O)—OC₄H₉ | blue |
| 60 | H | —C₆H₄—CF₃ | H | blue |
| 61 | H | —C₆H₄—COOCH₃ | H | blue |
| 62 | H | —C₆H₄—O—C₆H₅ | —C(=O)—NH—C₆H₅ | greenish blue |
| 63 | H | " | —C(=O)—OCH₃ | sky blue |

I claim:
1. An anthraquinoid dye of the formula

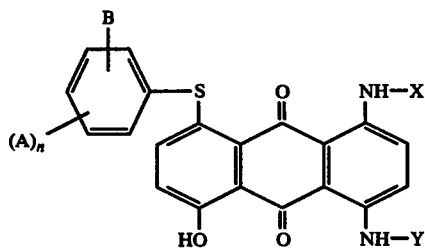

where Y is saturated alkyl of 3 to 5 carbon atoms, phenyl or a radical of the formula

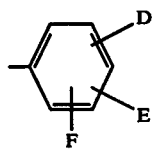

where D, E and F are hydrogen, alkyl of 1 to 4 carbon atoms, alkoxy of 1 to 4 carbon atoms, chlorine or bromine or D and E are hydrogen and F is alkoxycarbonyl (where alkoxy is of 1 to 4 carbon atoms), phenoxy, benzoylamino, trifluoromethyl or alkylcarbonyl (where alkyl is of 1 to 6 carbon atoms), and if more than one substituent is present, the substituents may be identical or different, X is

where R is saturated, linear or branched alkyl of 1 to 17 carbon atoms which is substituted by chlorine or bromine or is unsubstituted, phenylamino which is substituted by chlorine, bromine, methoxy or methyl or is unsubstituted, phenyl which is substituted by from 1 to 3 alkoxy of 1 to 4 carbon atoms, chlorine or bromine (and if more than one substituent is present these may be identical or different) or is unsubstituted, alkoxycarbonyl-alkyl (where alkoxy is of 1 to 8 carbon atoms and alkyl is of 2 to 4 carbon atoms), alkoxy of 1 to 10 carbon atoms or alkoxyalkyl of a total of 3 to 12 carbon atoms, A is chlorine, bromine, alkyl of 1 to 4 carbon atoms or alkoxy of 1 to 4 carbon atoms, B is hydrogen or nitro and n is 0, 1, 2 or 3 and if n >1 the radicals A may be identical or different.

2. An anthraquinoid dye of the formula

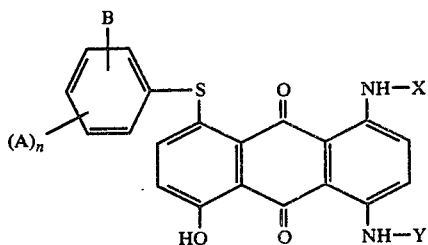

where Y is saturated, linear or branched alkyl of 3 to 5 carbon atoms, or phenyl which is unsubstituted or substituted by from 1 to 3 methyl, chlorine, methoxy, phenoxy, carbomethoxy or trifluoromethyl, X is

where R denotes alkyl of 1 to 8 carbon atoms, 3-chloropropyl, alkoxycarbonyl-alkyl (where alkoxy is of 1 to 4 carbon atoms and alkyl is of 2 to 4 carbon atoms), phenylamino which is unsubstituted or substituted by methyl, chlorine, bromine or methoxy, phenyl which is unsubstituted or substituted by chlorine, methyl or nitro, or alkoxy of 1 to 4 carbon atoms, A is chlorine, methyl or methoxy, B is hydrogen and n is 0 or 1.

3. A dye as claimed in claim 2, in which Y is phenyl, o-, m- or p-methylphenyl, m- or p-chlorophenyl, 3,5-dimethylphenyl, 2,4,6-trimethylphenyl, 4-methoxyphenyl or 4-phenoxyphenyl.

4. A dye as claimed in claim 2, in which X is

where R is methyl, ethyl, propyl, isopropyl, butyl, sec.-butyl, isobutyl, pentyl, 3-heptyl, 3-chloropropyl, methoxycarbonylethyl, methoxycarbonylbutyl, methoxycarbonylpropyl, phenylamino, phenyl, 4-chlorophenyl, 2-, 3- or 4-methylphenyl, 3- or 4-nitrophenyl, methoxy, ethoxy, propoxy or butoxy.

5. A dye as claimed in claim 3, in which X is

where R is methyl, ethyl, propyl, isopropyl, butyl, sec.-butyl, isobutyl, pentyl, 3-heptyl, 3-chloropropyl, methoxycarbonylethyl, methoxycarbonylbutyl, methoxycarbonylpropyl, phenylamino, phenyl, 4-chlorophenyl, 2-, 3- or 4-methylphenyl, 3- or 4-nitrophenyl, methoxy, ethoxy, propxoy or butoxy.

6. A dye as claimed in claim 2, in which the radical of the formula

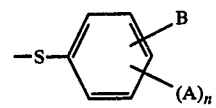

is thiophenyl, 4-methylthiophenyl, 4-methoxythiophenyl or 4-chlorothiophenol.

7. A dye as claimed in claim 3, in which the radical of the formula

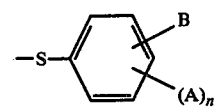

is thiophenyl, 4-methylthiophenyl, 4-methoxythiophenyl or 4-chlorothiophenyl.

8. A dye as claimed in claim 5, in which the radical of the formula

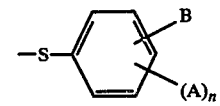

is thiophenyl.

9. The dye of the formula

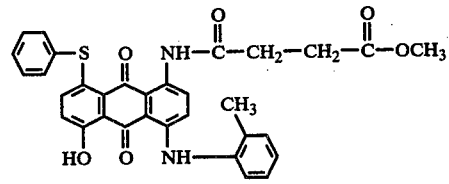

10. The dye of the formula

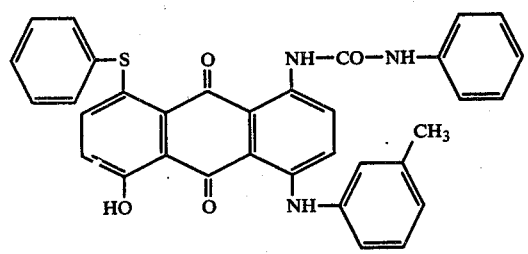

* * * * *